(12) United States Patent
Kang

(10) Patent No.: US 7,729,081 B1
(45) Date of Patent: Jun. 1, 2010

(54) ON-LINE BIAS ESTIMATOR IN HARD DISK DRIVES

(75) Inventor: Chang-Ik Kang, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 12/367,085

(22) Filed: Feb. 6, 2009

(51) Int. Cl.
*G11B 5/596* (2006.01)
(52) U.S. Cl. .................. 360/78.09; 360/78.04
(58) Field of Classification Search ......... None
See application file for complete search history.

(56) References Cited

U.S. PATENT DOCUMENTS 7,292,403 B2 * 11/2007 Baek et al. ............ 360/77.02
2007/0053095 A1 * 3/2007 Stoev et al. ............ 360/66
2008/0100954 A1 * 5/2008 Kang .................. 360/78.04
2009/0003146 A1 * 1/2009 Liu et al. ............... 369/43

* cited by examiner

*Primary Examiner*—Andrew L Sniezek
(74) *Attorney, Agent, or Firm*—Ben J. Yorks; Irell & Manella LLP

(57) ABSTRACT

A hard disk drive with a circuit that provides a control signal to a voice coil motor to move a head across a disk of the drive. The drive includes a flex circuit that applies a bias force onto an actuator arm coupled to the head. The circuit includes a state estimator that provides a plurality of estimation errors and a bias estimator that creates a bias estimate. The bias estimate includes an average of the estimation errors and is a function of the flex circuit bias force. The bias estimate is used to create the control signal provided to the voice coil motor. The bias estimate reduces seek time during a seek routine.

12 Claims, 5 Drawing Sheets

ON-LINE BIAS ESTIMATOR IN HARD DISK DRIVES

BACKGROUND OF THE INVENTION

1. Field of the Invention

The present invention relates to a seek routine of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks. The heads are typically electronically connected to the circuits of the drive by a flex circuit.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification, respectively.

Each sector may have also a servo field 5 located adjacent to a data field 6. The servo field 5 contains a plurality of servo bits A, B, C and D that are read and utilized in a servo routine to position the head 7 relative to the track. By way of example, the servo routine may utilize the algorithm of ((A-B)-(C-D)) to create a position error signal ("PES"). The PES is used to create a drive signal for the voice coil motor to position the head on the track.

To move the heads to a new disk location the drive performs a seek routine by providing a control signal to the voice coil motor. In a seek routine the heads are moved across the disks and then decelerated into a settle mode. Disk drives typically include a control loop. The control loop includes a state estimator that computes head position and head velocity estimates that are used to adjust the control signal provided to the voice coil motor.

During the settle mode there may be a disturbance in the flex circuit that increases the settle time of the servo process. The disturbance may include a biasing force exerted onto the actuator arm by the flex circuit. There are various approaches for compensating the flex circuit disturbances. For example, the integrator state of the controller can be read during on-track mode. Another approach that utilizes a state predictor is disclosed in U.S. Pat. No. 7,394,614 issued to Kang and assigned to Samsung Electronics Corp., Ltd.

The biasing force of the flex circuit may change from a negative to a positive value. A negative bias tends to inhibit overshoot during a seek routine, but a positive bias can create a large overshoot, increase seek time and degrade the performance of the drive.

BRIEF SUMMARY OF THE INVENTION

A hard disk drive with a circuit that provides a control signal to a voice coil motor to move a head across a disk of the drive. The drive includes a flex circuit that applies a bias force onto an actuator arm coupled to the head. The circuit includes a state estimator that provides a plurality of estimation errors and a bias estimator that creates a bias estimate. The bias estimate includes an average of the estimation errors and is a function of the flex circuit bias force. The bias estimate is used to create the control signal provided to the voice coil motor.

DETAILED DESCRIPTION

Disclosed is a hard disk drive with a circuit that provides a control signal to a voice coil motor to move a head across a disk of the drive. The drive includes a flex circuit that applies a bias force onto an actuator arm coupled to the head. The circuit includes a state estimator that provides a plurality of estimation errors and a bias estimator that creates a bias estimate. The bias estimate includes an average of the estimation errors and is a function of the flex circuit bias force. The bias estimate is used to create the control signal provided to the voice coil motor. The bias estimate reduces seek time during a seek routine.

Figure 2:
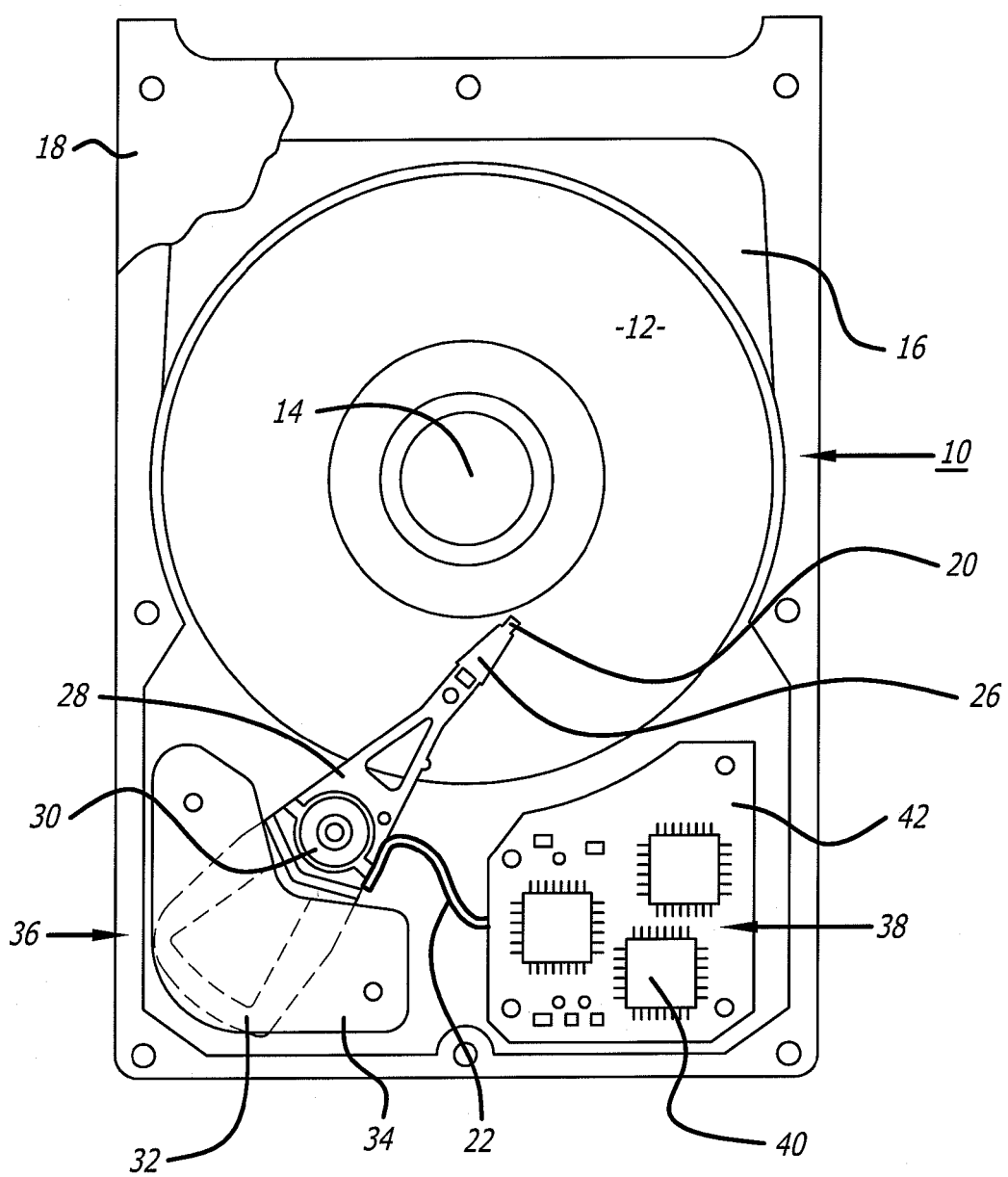
FIG. 2 is a top view of an embodiment of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements. The write element magnetizes the disk 12 to write data. The read element senses the magnetic fields of the disks 12 to read data. By way of example, the read element may be constructed from a magneto-resistive material that has a resistance which varies linearly with changes in magnetic flux. Each head is connected to a flex circuit 22. The flex circuit 22 provides an electrical connection between the head 20 and the electrical circuits of the drives.

Each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 3:
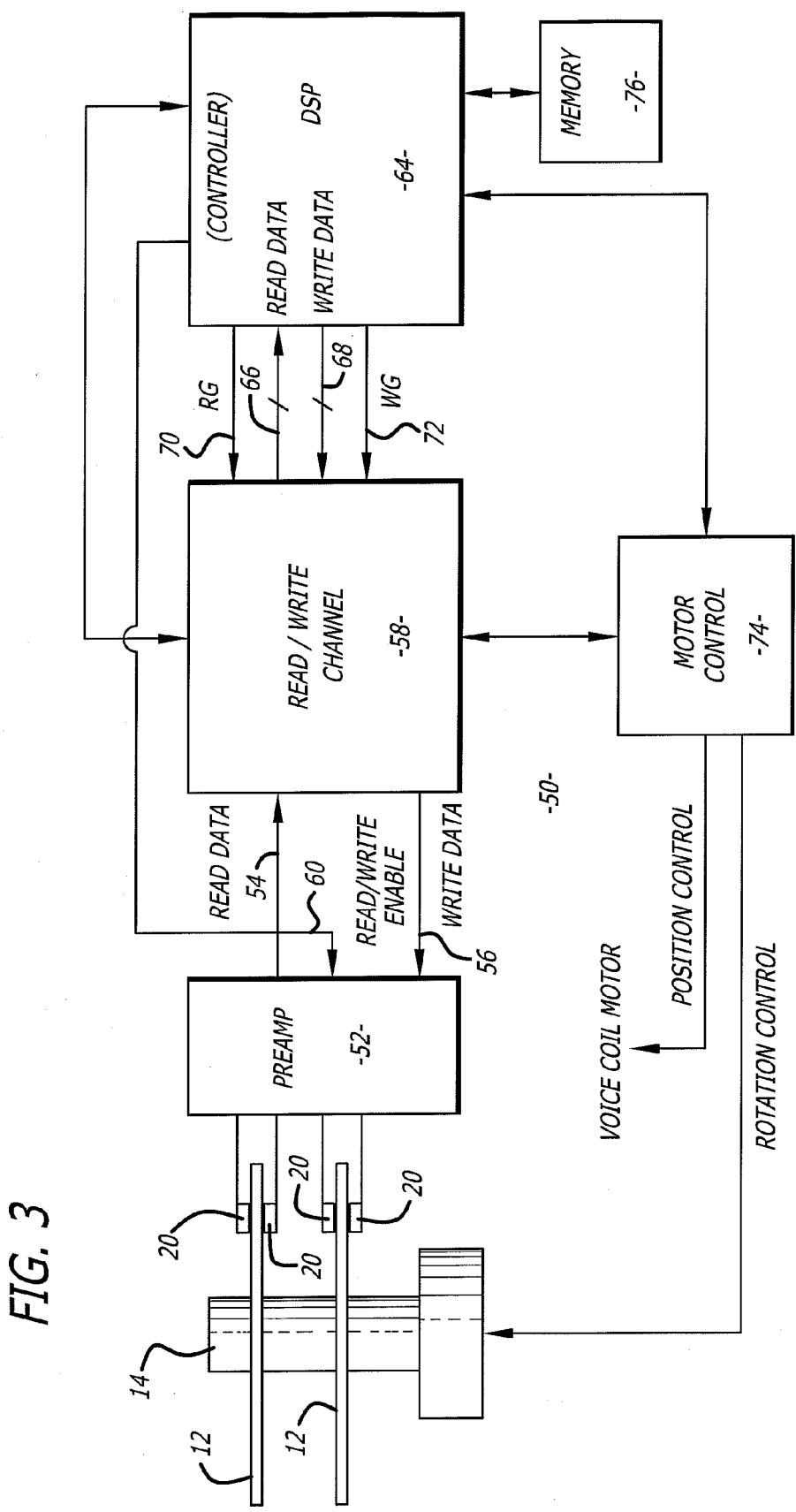
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

Figure 1:
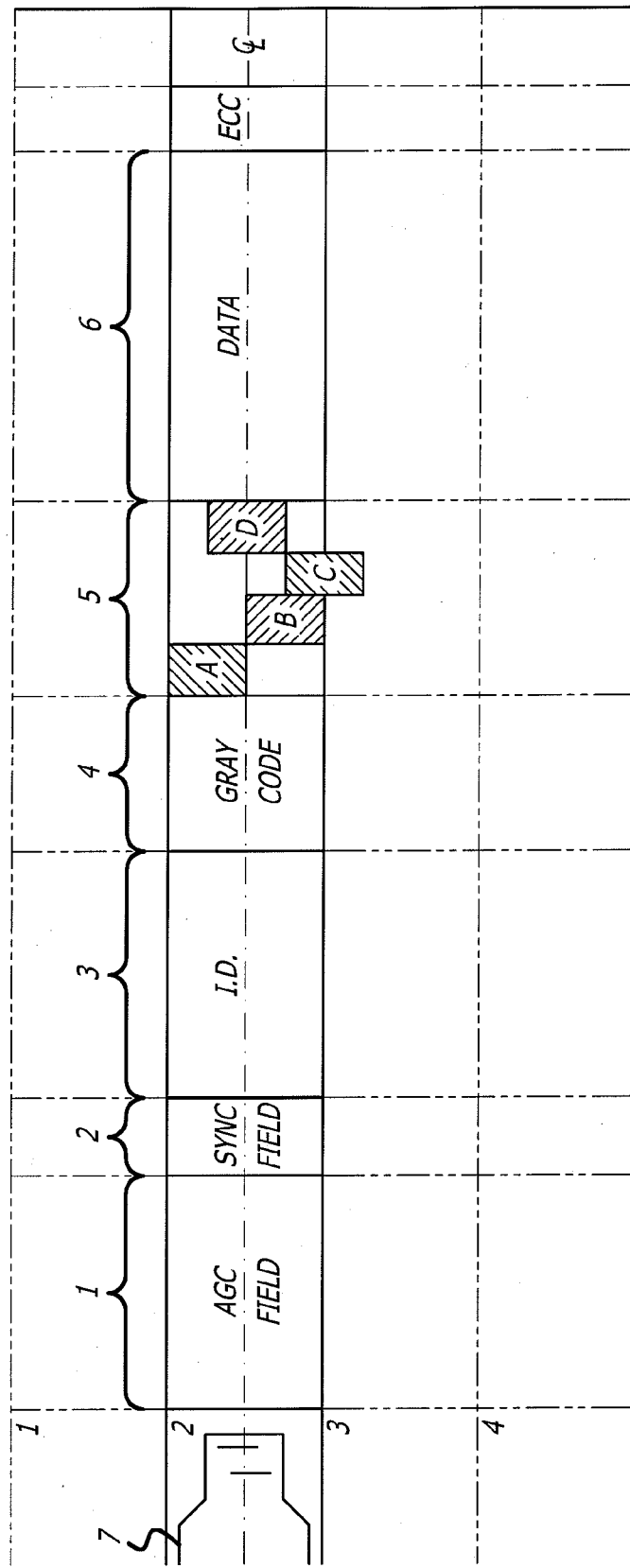
FIG. 1 is an illustration showing servo bits of a track.

Each sector of a disk track typically has servo bits A, B, C and D as shown in FIG. 1. The controller 64 may operate a servo routine utilizing the servo bits to position the head relative to the track. The head is moved in accordance with a position error signal ("PES"). The PES reflects the difference between a target position and the actual position of the head.

Figure 4:
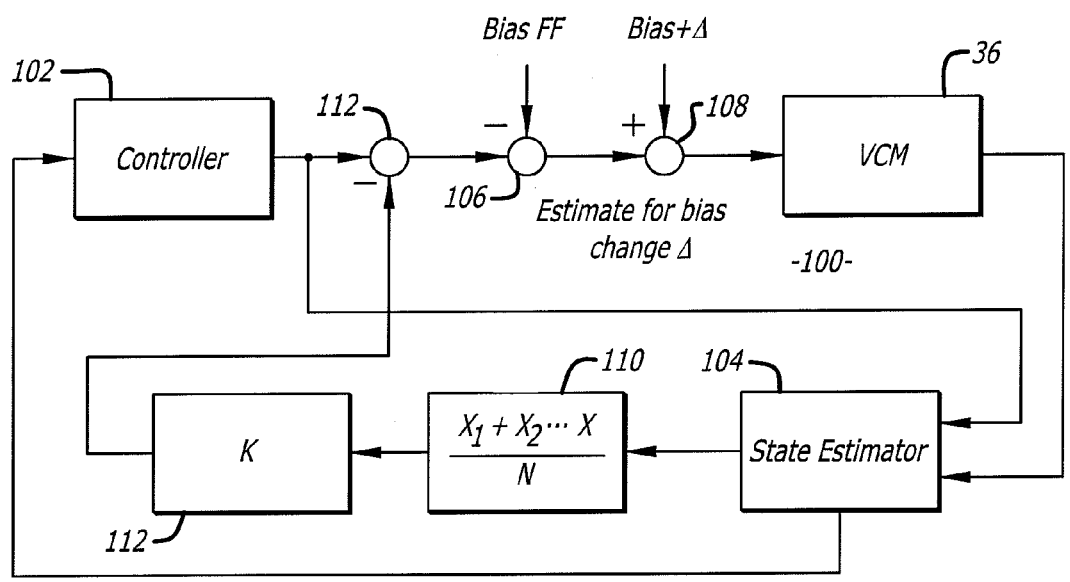
FIG. 4 is a schematic of a servo for the hard disk drive; and,
FIG. 5 is a graph showing seek time versus seek length for a drive with and without a bias estimate.

FIG. 4 shows a schematic of a servo system 100 used to perform a seek operation. The servo is typically performed by the controller 64. In a seek operation the heads are moved from one track location to another track location.

The system 100 may include a controller 102 and a state estimator 104. The controller 102 generates a control output signal to control the voice coil motor 36. The control output signal is summed at node 106 with a bias and summed again at node 108 with a change in the bias. The bias values correspond to bias forces applied by the flex circuit attached to the actuator arm. The bias forces can vary between positive and negative values.

The state estimator 104 receives the control output signal generated by the controller 102 and an actual position signal from the voice coil motor 36. The state estimator 104 generates a plurality of estimation errors $X_{1-N}$ each taken at a sample period n. The estimation errors are a function of a difference between a desired head position and the actual head position.

The system 100 also includes a bias estimator 110. The bias estimator 110 generates a bias estimate that is an average of the estimation errors. The average being the sum of the estimation errors divided by the total number of samples N. The average can be multiplied by a constant K in block 112. The constant K can be a transfer function that is determined from a flex circuit disturbance and the estimation error that results from the disturbance.

The bias estimate is summed with the output control signal at node 112. The bias estimate is intended to compensate for the change in bias that is introduced to the system at node 108. The system provides an on-line bias compensation scheme that can be used during a seek routine of the disk drive.

Figure 5:
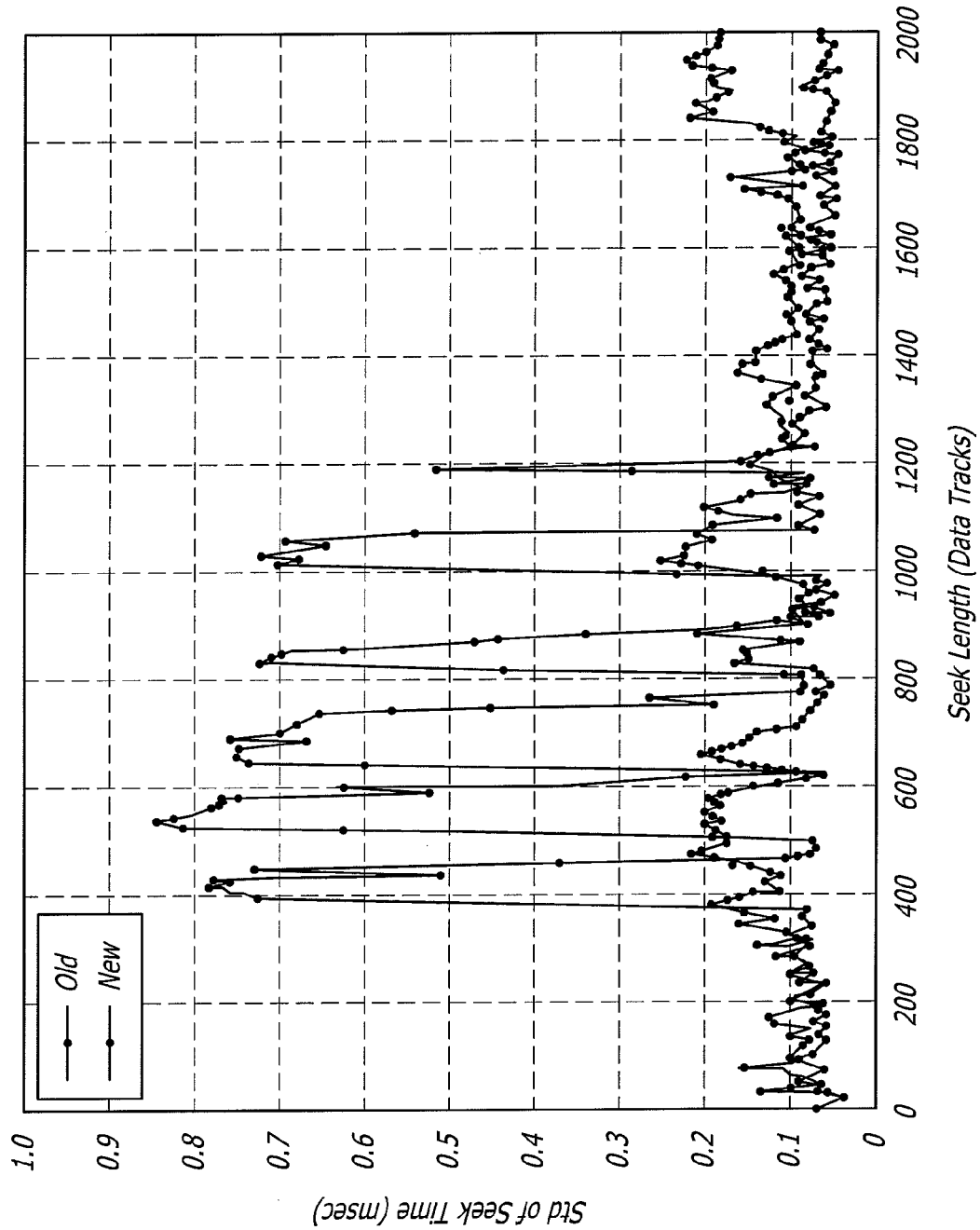

FIG. 5 is a graph showing seek time versus seek length. It can be seen that implementation of the bias estimate reduces seek time, particularly for seek lengths between 400 and 1200 tracks. With the average estimations, overshoot is eliminated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
    a disk;
    a head coupled to said disk;
    an actuator arm coupled to said head;
    a flex circuit coupled to said actuator arm, said flex circuit applies a bias force onto said actuator arm;
    a voice coil motor coupled to said actuator arm; and,
    a circuit that provides a control signal to said voice coil motor to move said head across said disk, said circuit includes a state estimator that provides a plurality of estimation errors and a bias estimator that creates a bias estimate that includes an average of said estimation errors and is a function of said flex circuit bias force, said bias estimate is used to create said control signal.

2. The hard disk drive of claim 1, wherein said bias force varies between negative and positive values.

3. The hard disk drive of claim 1, wherein said bias estimate includes a constant that is determined from a transfer function between a flex circuit disturbance and an estimation error of said disturbance.

4. The hard disk drive of claim 1, wherein said bias estimate is used during a seek routine.

5. The hard disk drive of claim 1, wherein said circuit includes a controller.

6. A hard disk drive, comprising:
    a disk;
    a head coupled to said disk;
    an actuator arm coupled to said head;
    a voice coil motor coupled to said actuator arm;
    a flex circuit coupled to said actuator arm, said flex circuit applies a bias force onto said actuator arm; and,
    circuit means for providing a control signal to said voice coil motor to move said head across said disk, and for providing a plurality of estimation errors and a bias estimator that creates a bias estimate that includes an average of said estimation errors and is a function of said flex circuit bias force, said bias estimate is used to create said control signal.

7. The hard disk drive of claim 6, wherein said bias force varies between negative and positive values.

8. The hard disk drive of claim 6, wherein said bias estimate includes a constant that is determined from a transfer function between a flex circuit disturbance and an estimation of said disturbance.

9. The hard disk drive of claim 6, wherein said bias estimate is used during a seek routine.

10. A method for moving a head across a disk in a hard disk drive, comprising:
    moving a head relative to a disk, the head being coupled to a flex circuit that applies a bias force to an actuator arm coupled to the head;
    computing a plurality of estimation errors;
    computing a bias estimate that includes an average of the error estimates, the bias estimate being a function of the bias force of the flex circuit;
    determining a control signal that is a function of the bias estimate; and,
    providing the control signal to a voice coil motor to further move the head relative to the disk.

11. The method of claim 10, wherein the bias force varies between negative and positive values.

12. The method of claim 10, wherein the bias estimate includes a constant that is determined from a transfer function between a flex circuit disturbance and an estimation error of the disturbance.

* * * * *